US010067677B2

(12) United States Patent
Chu

(10) Patent No.: US 10,067,677 B2
(45) Date of Patent: Sep. 4, 2018

(54) MEMORY MANAGEMENT METHOD FOR CONFIGURING SUPER PHYSICAL UNITS OF REWRITABLE NON-VOLATILE MEMORY MODULES, MEMORY CONTROL CIRCUIT UNIT AND MEMORY STORAGE DEVICE

(71) Applicant: PHISON ELECTRONICS CORP., Miaoli (TW)

(72) Inventor: Chien-Hua Chu, Hsinchu County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 8 days.

(21) Appl. No.: 15/052,891

(22) Filed: Feb. 25, 2016

(65) Prior Publication Data
US 2017/0177260 A1  Jun. 22, 2017

(30) Foreign Application Priority Data

Dec. 18, 2015 (TW) .............................. 104142657 A

(51) Int. Cl.
*G06F 3/06* (2006.01)
(52) U.S. Cl.
CPC ............ *G06F 3/0608* (2013.01); *G06F 3/064* (2013.01); *G06F 3/0659* (2013.01); *G06F 3/0688* (2013.01)
(58) Field of Classification Search
CPC .... G06F 3/0631; G06F 3/0604; G06F 3/0652; G06F 3/0679; G11C 16/14
See application file for complete search history.

(56) References Cited

U.S. PATENT DOCUMENTS

| 8,095,765 B2* | 1/2012 | Asnaashari | ......... G06F 12/0246 711/103 |
| 8,209,474 B1* | 6/2012 | Weiler | ................ G06F 12/0246 365/185.33 |
| 8,898,548 B1* | 11/2014 | Mullendore | ........ G06F 11/1048 365/185.09 |
| 2008/0052446 A1* | 2/2008 | Lasser | ................ G06F 12/0246 711/103 |
| 2010/0149881 A1 | 6/2010 | Lee et al. | |

(Continued)

FOREIGN PATENT DOCUMENTS

TW              I494849             8/2015

OTHER PUBLICATIONS

Memory Management in NAND Flash Arrays, Micron Technology, Technical Note, TN-29-28, 2005 [obtained from U.S. Appl. No. 14/498,566 NPL documents].*

(Continued)

*Primary Examiner* — Hal Schnee
*Assistant Examiner* — Nicholas A. Paperno
(74) *Attorney, Agent, or Firm* — JCIPRNET

(57) ABSTRACT

A memory management method, a memory control circuit unit and a memory storage device are provided. The method includes: configuring a plurality of first type super physical units, and each of the first type super physical units includes at least two good physical erasing units which may be programmed simultaneously. The method also includes: configuring at least one second type super physical unit, and the at least one second type super physical unit includes at least two good physical erasing units which may not be programmed simultaneously.

21 Claims, 13 Drawing Sheets

(56) References Cited

U.S. PATENT DOCUMENTS

2012/0096217 A1* 4/2012 Son .................. G06F 12/0246
　　　　　　　　　　　　　　　　　　　711/103

OTHER PUBLICATIONS

Buckel, Understanding Flash: Blocks, Pages and Program/Erases, flashba.com, Jun. 2014 [retrieved from internet Dec. 19, 2017][<URL:https://flashdba.com/2014/06/20/understanding-flash-blocks-pages-and-program-erases/>] (Year: 2014).*

Larrivee, Solid State Drive Primer #5—NAND Architecture—Planes and Die, Cactus Technologies, Apr. 2015 [retrieved from internet Dec. 19, 2017][<URL:https://www.cactus-tech.com/resources/blog/details/solid-state-drive-primer-5-nand-architecture-planes-and-die>] (Year: 2015).*

"Office Action of Taiwan Counterpart Application", dated Nov. 29, 2016, p. 1-p. 4.

* cited by examiner

MEMORY MANAGEMENT METHOD FOR CONFIGURING SUPER PHYSICAL UNITS OF REWRITABLE NON-VOLATILE MEMORY MODULES, MEMORY CONTROL CIRCUIT UNIT AND MEMORY STORAGE DEVICE

CROSS-REFERENCE TO RELATED APPLICATION

This application claims the priority benefit of Taiwan application serial no. 104142657, filed on Dec. 18, 2015. The entirety of the above-mentioned patent application is hereby incorporated by reference herein and made a part of this specification.

BACKGROUND

Technical Field

The present invention relates to a memory management method, and more particularly, relates to a memory management method, a memory control circuit unit and a memory storage device for a rewritable non-volatile memory module.

Description of Related Art

The markets of digital cameras, cellular phones, and MP3 players have expanded rapidly in recent years, resulting in escalated demand for storage media by consumers. The characteristics of data non-volatility, low power consumption, and compact size make a rewritable non-volatile memory module (e.g., a flash memory) ideal to be built in the portable multi-media devices as cited above.

Generally, the rewritable non-volatile memory module is controlled by one memory control circuit unit. The memory control circuit unit can receive data from a host system, and write the data into the rewritable non-volatile memory module. In certain configurations, the rewritable non-volatile memory module has a plurality of planes, and each of the planes includes a plurality of physical erasing units. The memory control circuit unit can configure the physical erasing units belonging to different planes as the same super physical unit, and the memory control circuit unit can program the physical erasing units in the same super physical unit alternately or simultaneously. Accordingly, a speed for writing data into the rewritable non-volatile memory module may be increased when what issued by the host system is the sequential data.

However, each plane of the rewritable non-volatile memory module may include good physical erasing units and bad physical erasing units, and yet the memory control circuit unit may only use the good physical erasing units in each plane to configure the super physical unit. If each plane includes a different number of the bad physical erasing units, each plane will then include an unequal number of the good physical erasing units. Under such circumstance, remaining good physical erasing units that may not be configured as the super physical unit will exist in the plane having more good physical erasing units to thereby influence the size of the actual usable storage space. Therefore, it has become one of the major subjects for person skilled in the art as how to fully utilize the good physical erasing units to configure the super physical unit in order to improve usage rate of the physical erasing units.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a memory management method, a memory control circuit unit and a memory storage device, which are capable of configuring a plurality of physical erasing units belonging to the same plane as the same super physical unit, so as to configure more super physical units.

An exemplary embodiment of the present invention provides a memory management method for a memory storage device. The memory storage device has a rewritable non-volatile memory module, and the rewritable non-volatile memory module has a plurality of good physical erasing units. The memory management method includes: allocating a part of the good physical erasing units for configuring a plurality of first type super physical units. Herein, each of the first type super physical units at least includes a first good physical erasing unit and a second good physical erasing unit, and the first good physical erasing unit and the second good physical erasing unit are simultaneously programmed. The memory management method also includes: allocating another part of the good physical erasing units for configuring at least one second type super physical unit. The at least one second type physical unit at least includes a third good physical erasing unit and a fourth good physical erasing unit, and the third good physical erasing unit and the fourth good physical erasing unit are not simultaneously programmed.

An exemplary embodiment of the present invention provides a memory control circuit unit, which is configured to control a rewritable non-volatile memory module. The rewritable non-volatile memory module includes a plurality of good physical erasing units. The memory control circuit unit includes a host interface, a memory interface and a memory management circuit. The host interface is coupled to a host system. The memory interface is coupled to the rewritable non-volatile memory module. The memory management circuit is coupled to the host interface and the memory interface. The memory management circuit is configured to allocate a part of the good physical erasing units for configuring a plurality of first type super physical units. Herein, each of the first type super physical units at least includes a first good physical erasing unit and a second good physical erasing unit, and the first good physical erasing unit and the second good physical erasing unit are simultaneously programmed. Moreover, the memory management circuit is further configured to allocate another part of the good physical erasing units for configuring at least one second type super physical unit. The at least one second type physical unit at least includes a third good physical erasing unit and a fourth good physical erasing unit, and the third good physical erasing unit and the fourth good physical erasing unit are not simultaneously programmed.

An exemplary embodiment of the present invention provides a memory storage device, which includes a connection interface unit, a rewritable non-volatile memory module and aforesaid memory control circuit unit. The connection interface unit is coupled to a host system. The memory control circuit unit is coupled to the connection interface unit and the rewritable non-volatile memory module.

Based on the above, the memory management method, the memory control circuit unit and the memory storage device as proposed in exemplary embodiments of the present invention are capable of configuring multiple good physical erasing units belonging to the same plane as the same super physical unit. As a result, the number of the configured super physical units may be increased, and the good physical erasing units in the rewritable non-volatile memory module may also be utilized more efficiently.

To make the above features and advantages of the present disclosure more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
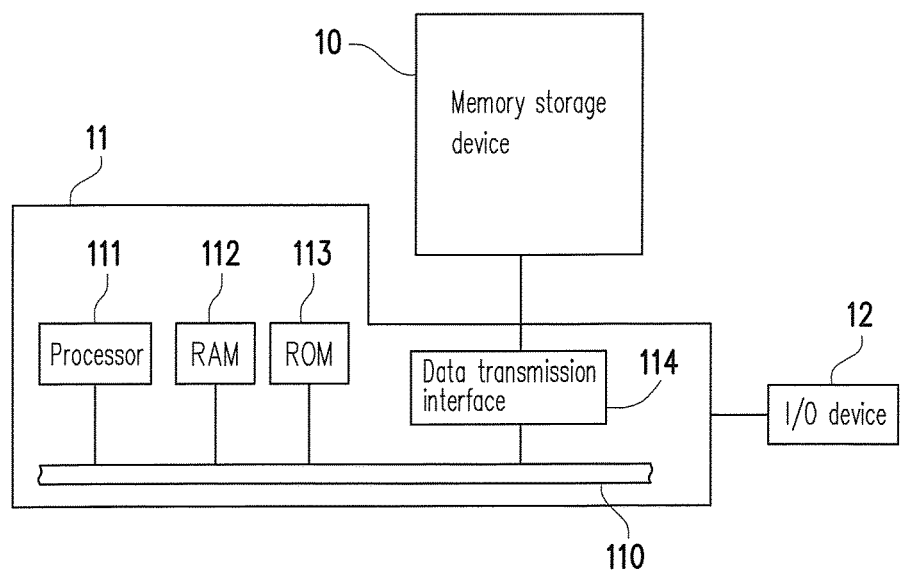
FIG. 1 is a schematic diagram illustrating a host system, a memory storage device and an input/output (I/O) device according to an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage device (also known as a memory storage system) includes a rewritable non-volatile memory module and a controller (also known as a control circuit unit). The memory storage device is usually configured together with a host system so that the host system may write data into the memory storage device or read data from the memory storage device.

Figure 2:
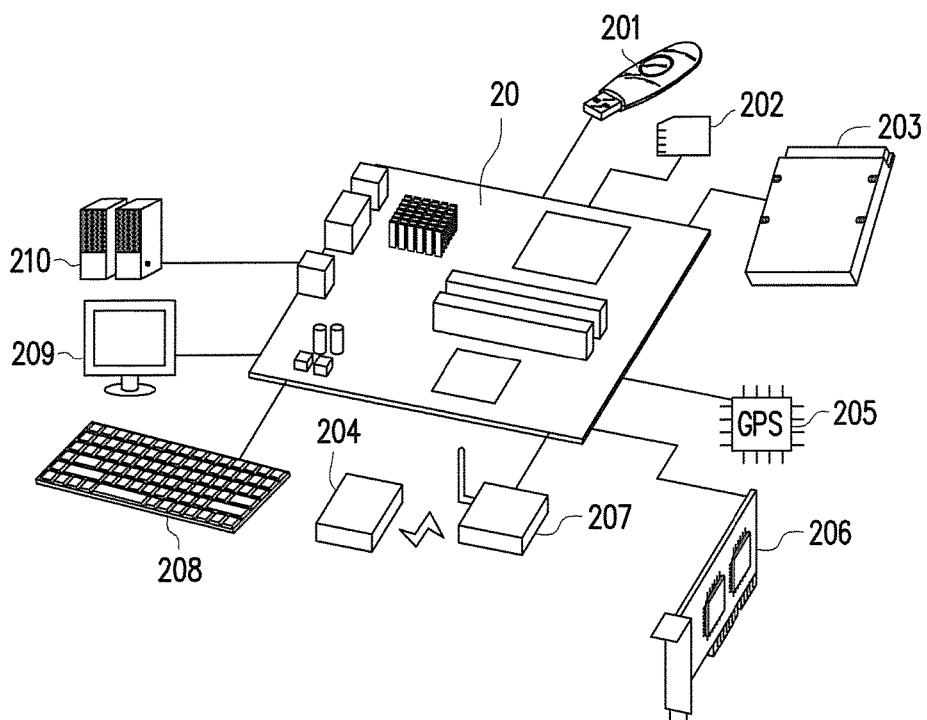
FIG. 2 is a schematic diagram illustrating a host system, a memory storage device and an input/output (I/O) device according to another exemplary embodiment.

FIG. 1 is a schematic diagram illustrating a host system, a memory storage device and an input/output (I/O) device according to an exemplary embodiment. FIG. 2 is a schematic diagram illustrating a host system, a memory storage device and an input/output (I/O) device according to another exemplary embodiment.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In this exemplary embodiment, the host system 11 is coupled to a memory storage device 10 through the data transmission interface 114. For example, the host system 11 can write data into the memory storage device 10 or read data from the memory storage device 10 through the data transmission interface 114. Further, the host system 111 is coupled to an I/O device 12 through the system bus 110. For example, the host system 11 can transmit output signals to the I/O device 12 or receive input signals from I/O device 12 through the system bus 110.

In this exemplary embodiment, the processor 111, the RAM 112, the ROM 113 and the data transmission interface 114 are disposed on a main board 20 of the host system 11. The number of the data transmission interface 114 may be one or more. Through the data transmission interface 114, the main board 20 may be coupled to the memory storage device 10 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication Storage) memory storage device, a WiFi (Wireless Fidelity) memory storage device, a Bluetooth memory storage device, a BLE (Bluetooth low energy) memory storage device (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage device 204 through the wireless transmission device 207.

Figure 3:
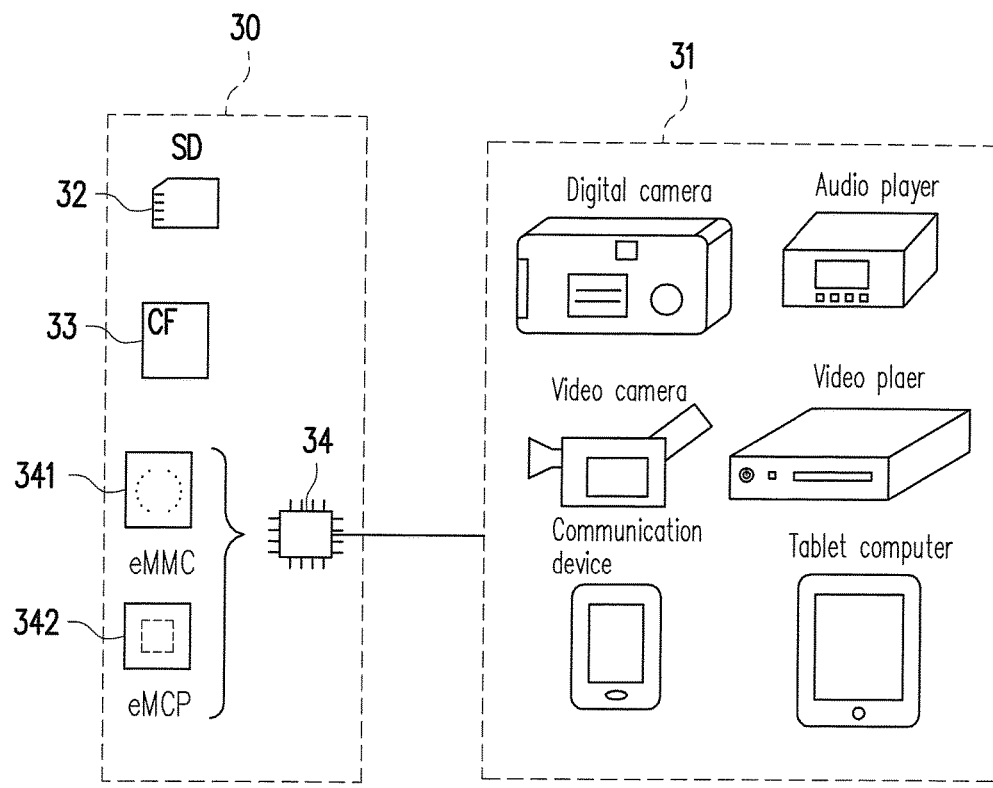
FIG. 3 is a schematic diagram illustrating a host system and a memory storage device according to another exemplary embodiment.

In an exemplary embodiment, aforementioned host system may be any systems capable of substantially cooperating with the memory storage device for storing data. Although the host system is illustrated as a computer system in foregoing exemplary embodiment, however, FIG. 3 is a schematic diagram illustrating a host system and a memory storage device according to another exemplary embodiment. Referring to FIG. 3, in another exemplary embodiment, a host system 31 may also be a system including a digital camera, a video camera, a communication device, an audio player, a video player or a tablet computer, whereas a memory storage device 30 can be various non-volatile memory devices used by the host system, such as a SD card 32, a CF card 33 or an embedded storage device 34. The embedded storage device 34 includes various embedded storage devices capable of directly coupling a memory module onto a substrate of the host system, such as an eMMC (embedded MMC) 341 and/or an eMCP (embedded Multi Chip Package) 342.

Figure 4:
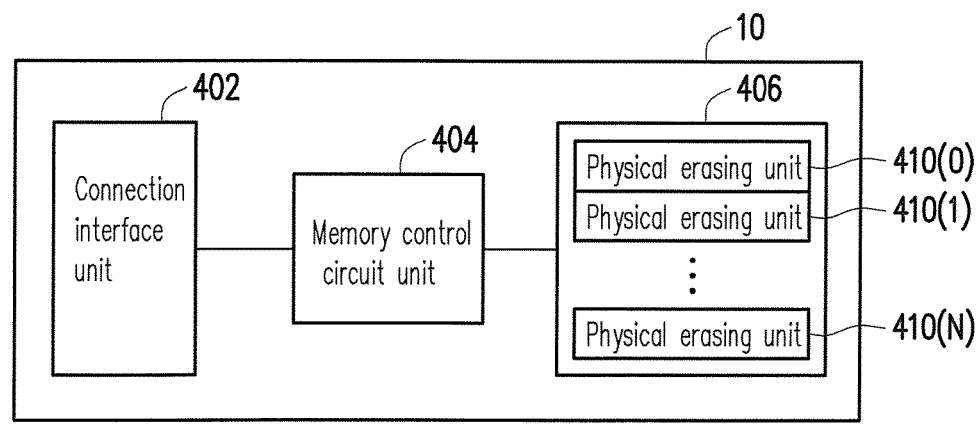
FIG. 4 is a schematic block diagram illustrating a host system and a memory storage device according to an exemplary embodiment.

FIG. 4 is a schematic block diagram illustrating a host system and a memory storage device according to an exemplary embodiment.

Referring to FIG. 4, the memory storage device 10 includes a connection interface unit 402, a memory control circuit unit 404 and a rewritable non-volatile memory module 406.

In this exemplary embodiment, the connection interface unit 402 is compatible with a SATA (Serial Advanced Technology Attachment) standard. Nevertheless, it should be understood that the invention is not limited thereto. The connection interface unit 402 may also be compatible to a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a UHS-I (Ultra High Speed-I) interface standard, a UHS-II (Ultra High Speed-II) interface standard, a SD (Secure Digital) interface standard, a MS (Memory Stick) interface standard, a Multi-Chip Package interface standard, a MMC (Multi Media Card) interface standard, an eMMC (Embedded Multimedia Card) interface standard, a UFS (Universal Flash Storage) interface standard, an eMCP (embedded Multi Chip Package) interface standard, a CF (Compact Flash) interface standard, an IDE (Integrated Device Electronics) interface standard or other suitable standards. In this exemplary embodiment, the connection interface unit 402 and the memory control circuit unit 404 may be packaged into one chip, or the connection interface unit 402 is distributed outside of a chip containing the memory control circuit unit.

The memory control circuit unit 404 is configured to execute a plurality of logic gates or control instructions which are implemented in form of hardware or firmware, so as to execute operations of writing, reading or erasing data in the rewritable non-volatile memory storage module 406 according to the commands of the host system 11.

The rewritable non-volatile memory module 406 is coupled to the memory control circuit unit 404 and configured to store data written from the host system 11. The rewritable non-volatile memory storage module 406 includes a plurality of physical erasing units 410(0) to 410(N). For example, the physical erasing units 410(0) to 410(N) may belong to the same memory die or belong to different memory dies. Each physical erasing unit has a plurality of physical programming units, and the physical programming units of the same physical erasing unit may be written separately and erased simultaneously. Nevertheless, it should be understood that the present invention is not limited thereto. Each physical erasing unit is composed by 64 physical programming units, 256 physical programming units or any number of the physical programming units.

More specifically, the physical erasing unit is the minimum unit for erasing. Namely, each physical erasing unit contains the least number of memory cells to be erased together. The physical programming unit is the minimum unit for programming. That is, the programming unit is the minimum unit for writing data. Each physical programming unit usually includes a data bit area and a redundancy bit area. The data bit area having multiple physical access addresses is used to store user data, and the redundant bit area is used to store system data (e.g., control information and error checking and correcting code). In this exemplary embodiment, each data bit area of the physical programming unit contains 8 physical access addresses, and the size of each physical access address is 512 bytes. However, in other exemplary embodiments, the data bit area may also include more or less of the physical access addresses, and the size and the number of the physical access addresses are not limited in the present invention. For example, in an exemplary embodiment, the physical erasing unit is a physical block, and the physical programming unit is a physical page or a physical sector, but the present invention is not limited thereto.

In this exemplary embodiment, each of the physical erasing units 410(0) to 410(N) belongs to one of a plurality of operation units. The physical erasing units belonging to different operation units may be programmed alternately or simultaneously. For instance, the operation unit may be a channel, a chip, a die or a plane. More specifically, in an exemplary embodiment, the memory storage device 10 includes a plurality of channels, and the memory control circuit unit 404 accesses different parts of the physical erasing units 410(0) to 410(N) through different channels. The physical erasing units on the different channels may operate independently. For instance, while the memory control circuit unit 404 is executing a writing operation on the physical erasing units on one channel, the memory control circuit unit 404 can simultaneously execute a reading operation or other operations on the physical erasing units on another channel. In the memory storage device 10, the physical erasing units in the same channel may belong to different chips. In an exemplary embodiment, the physical erasing units belonging to different chips also belong to different interleaves. After the physical erasing units in a specific chip are programmed, the memory control circuit unit 404 may continue to program the physical erasing units in the next chip without waiting for a ready signal replied from the specific chip. In the rewritable non-volatile memory module 406, the physical erasing units in the same interleave may also belong to different planes. In the same interleave, the physical erasing units belonging to different planes may be simultaneously programmed according to the same write command.

In an exemplary embodiment, the memory storage device 10 includes one channel and one chip, and such chip includes two planes, but the invention is not limited thereto. In another exemplary embodiment, the memory storage device 10 may also include n channels, m interleaves, and k planes. Herein, n, m and k are positive integers, and one the positive integers is greater than 1 (i.e., the memory storage device 10 includes a plurality of operation units). However, values of the positive integers n, m and k are not particularly limited in the present invention.

In this exemplary embodiment, the rewritable non-volatile memory module 406 is a MLC (Multi Level Cell) NAND flash memory module (i.e., a flash memory module capable of storing two data bits in one memory cell). However, the present invention is not limited thereto. The rewritable non-volatile memory module 406 may also be a SLC (Single Level Cell) NAND flash memory module, (i.e., a flash memory module capable of storing one data bit in one memory cell), a TLC (Trinary Level Cell) NAND flash memory module (i.e., a flash memory module capable of storing three data bits in one memory cell), other flash memory modules or any memory module having the same features.

Figure 5:
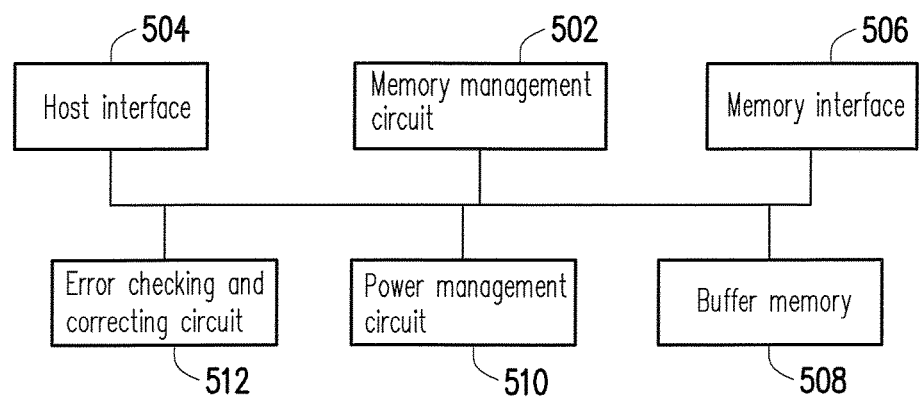
FIG. 5 is a schematic block diagram illustrating a memory control circuit unit according to an exemplary embodiment.

FIG. 5 is a schematic block diagram illustrating a memory control circuit unit according to an exemplary embodiment.

Referring to FIG. 5, the memory control circuit unit 404 includes a memory management circuit 502, a host interface 504, a memory interface 506, a buffer memory 508, a power management circuit 510, and an error checking and correcting circuit 512.

The memory management circuit 502 is configured to control overall operations of the memory control circuit unit 404. Specifically, the memory management circuit 502 has a plurality of control instructions. During operations of the memory storage device 10, the control instructions are executed to execute various operations such as writing, reading and erasing data.

In this exemplary embodiment, the control instructions of the memory management circuit 502 are implemented in form of firmware. For instance, the memory management circuit 502 has a microprocessor unit (not illustrated) and a read-only memory (not illustrated), and the control instructions are burnt into the read-only memory. During the operations of the memory storage device 10, the control instructions are executed by the microprocessor to perform operations of writing, reading or erasing data.

In another exemplary embodiment of the invention, the control instructions of the memory management circuit 502 may also be stored into a specific area (for example, a system area in the memory module exclusively used for storing the system data) of the rewritable non-volatile memory module 406 as program codes. In addition, the memory management circuit 502 has a microprocessor unit (not illustrated), a ROM (not illustrated) and a RAM (not illustrated). Particularly, the ROM has a boot code, which is executed by the microprocessor unit to load the control instructions stored in the rewritable non-volatile memory module 406 to the RAM of the memory management circuit 502 when the memory control circuit unit 404 is enabled. Thereafter, the control instructions are executed by the microprocessor unit to execute operations of writing, reading or erasing data.

Further, in another exemplary embodiment, the control instructions of the memory management circuit 502 may also be implemented in a form of hardware. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory management circuit is configured to manage the physical erasing units of the rewritable non-volatile memory module 406; the memory writing circuit is configured to issue a write command to the rewritable non-volatile memory module 406 in order to write data into the rewritable non-volatile memory module 406; the memory reading circuit is configured to issue a read command to the rewritable non-volatile memory module 406 in order to read data from the rewritable non-volatile memory module 406; the memory erasing circuit is configured to issue an erase command to the rewritable non-volatile memory module 406 in order to erase data from the rewritable non-volatile memory module 406; the data processing circuit is configured to process both the data to be written to the rewritable non-volatile memory module 406 and the data to be read from the rewritable non-volatile memory module 406.

The host interface 504 is coupled to the memory management circuit 502 and configured to couple to the connection interface unit 402, so as to receive and identify commands and data sent from the host system 11. In other words, the commands and the data sent from the host system 11 are passed to the memory management circuit 502 through the host interface 504. In this exemplary embodiment, the host interface 504 is compatible with the SATA standard. However, it should be understood that the present invention is not limited thereto, and the host interface 504 may also be compatible with a PATA standard, an IEEE 1394 standard, a PCI Express standard, a USB standard, a UHS-I standard, a UHS-II standard, a SD standard, a MS standard, a MMC standard, a CF standard, an IDE standard, or other suitable standards for data transmission.

The memory interface 506 is coupled to the memory management circuit 502 and configured to access the rewritable non-volatile memory module 406. In other words, data to be written to the rewritable non-volatile memory module 406 is converted to a format acceptable to the rewritable non-volatile memory module 406 through the memory interface 506.

The buffer memory 508 is coupled to the memory management circuit 502 and configured to temporarily store data and commands from the host system 11 or data from the rewritable non-volatile memory module 406.

The power management unit 510 is coupled to the memory management circuit 502 and configured to control a power of the memory storage device 10.

The error checking and correcting circuit 512 is coupled to the memory management circuit 502 and configured to execute an error checking and correcting process to ensure the correctness of data. Specifically, when the memory management circuit 502 receives a write command from the host system 11, the error checking and correcting circuit 512 generates an ECC code (Error Checking and Correcting Code) for data corresponding to the write command, and the memory management circuit 502 writes data and the ECC code corresponding to the write command into the rewritable non-volatile memory module 406. Subsequently, when the memory management circuit 502 reads the data from the rewritable non-volatile memory module 406, the error checking and correcting code corresponding to the data is also read, and the error checking and correcting circuit 512 may execute the error checking and correcting procedure for the read data according to the error checking and correcting code.

Figure 6:
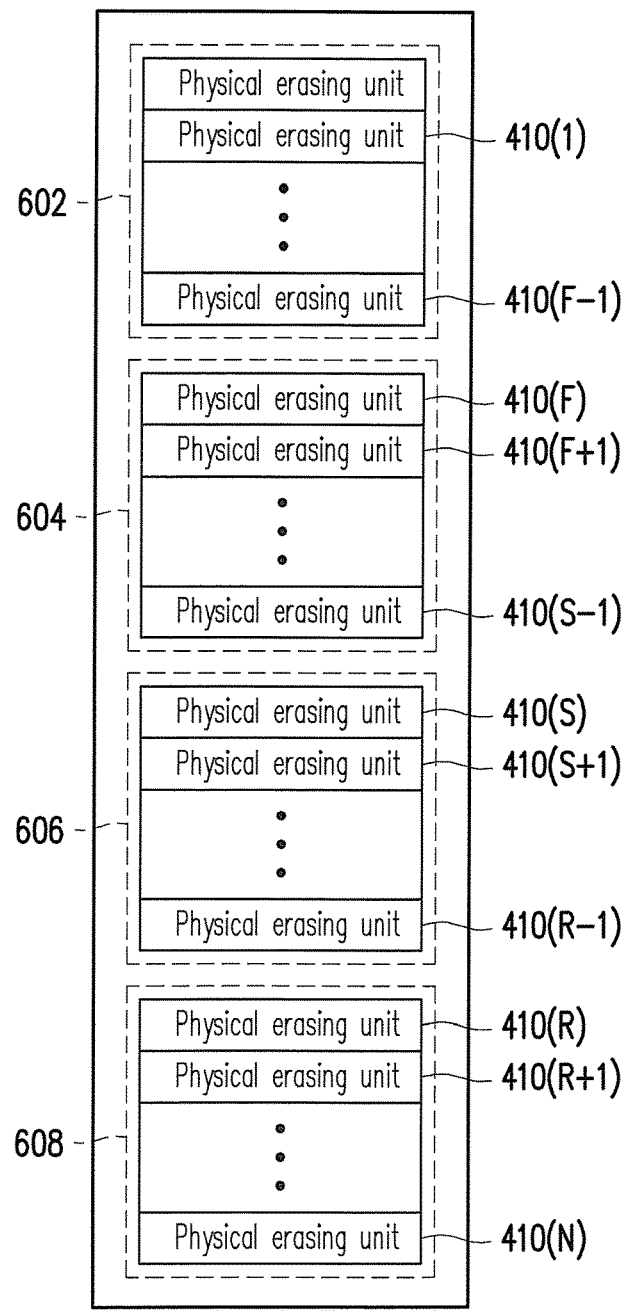
FIG. 6 and FIG. 7 are schematic diagrams illustrating a management of the physical erasing units according to an exemplary embodiment.
Figure 7:
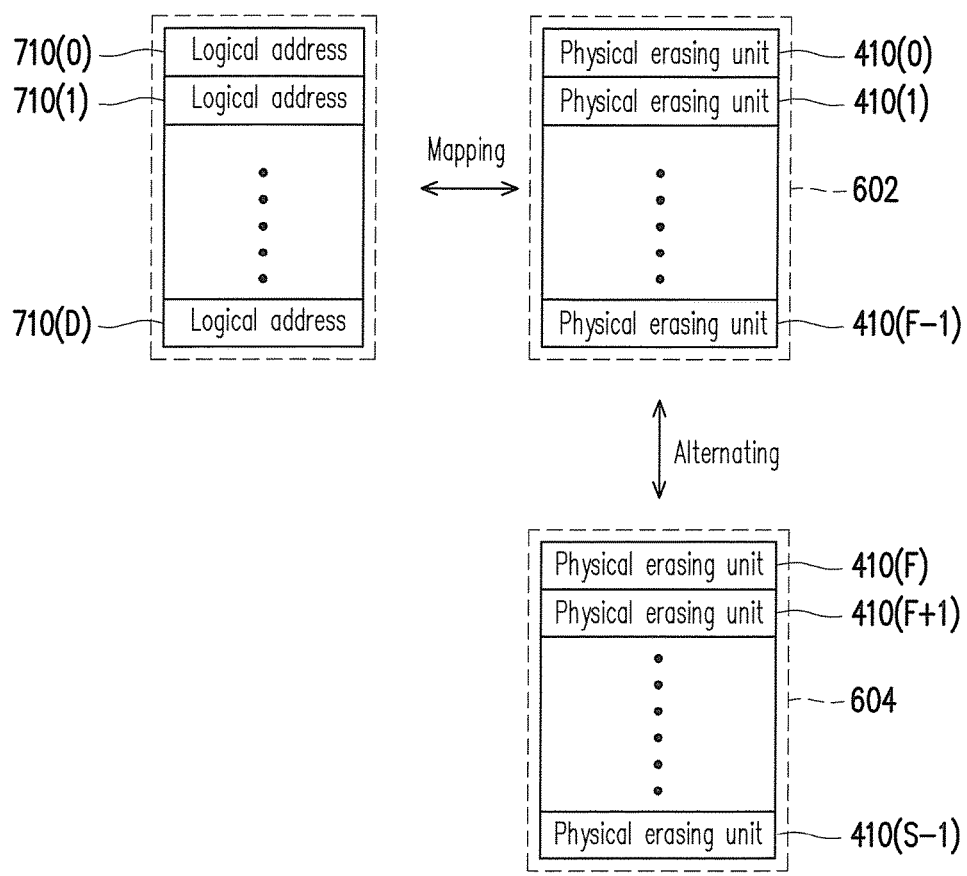

FIG. 6 and FIG. 7 are schematic diagrams illustrating a management of the physical erasing units according to an exemplary embodiment.

It should be understood that terms, such as "select", "group", "divide", "associate" and so forth, are logical concepts which describe operations in the physical erasing units of the rewritable non-volatiles memory module 406. That is to say, rather than changing actual positions of the physical units of the rewritable non-volatile memory module, the physical erasing units of the rewritable non-volatile memory module are logically operated.

Referring to FIG. 6, the memory control circuit unit 404 (or the memory management circuit 502) may logically group the physical erasing units 410(0) to 410(N) into a data area 602, a spare area 604, a system area 606 and a replacement area 608.

The physical erasing units logically belonging to the data area 602 and the spare area 604 are configured to store data from the host system 11. More specifically, the physical erasing units of the data area 602 are regarded as the physical erasing units stored with data, whereas the physical erasing units of the spare area 604 are configured to replace the physical erasing units of the data area 602. In other words, when the write command and the data to be written are received from the host system 11, the memory management circuit 502 selects the physical erasing units from the spare area 604, and writes the data into the selected physical erasing units in order to replace the physical erasing units in the data area 602.

The physical erasing units logically belonging to the system area 606 are configured to record system data. For example, the system data includes information related to manufacturer and model of the rewritable non-volatile memory module, the number of physical erasing units in the rewritable non-volatile memory module, the number of the physical programming units in each physical erasing unit, and so forth.

The physical erasing units logically belonging to the replacement area 608 are used in a bad physical erasing unit replacement procedure for replacing damaged physical erasing units. More specifically, if normal physical erasing units are still available in the replacement area 608 when the physical erasing units of the data area 602 are damaged, the memory management circuit 502 selects the normal physical erasing units from the replacement area 608 for replacing the damaged physical erasing units.

Particularly, the numbers of the physical erasing units in the data area 602, the spare area 604, the system area 606 and the replacement area 608 may be different from one another according to the different memory specifications. In addition, it should be understood that, during operations of the memory storage device 10, grouping relations of the physical erasing units for associating with the data area 602, the spare area 604, the system area 606, and the replacement area 608 may be dynamically changed. For example, when the damaged physical erasing units in the spare area 604 are replaced by the physical erasing units in the replacement area 608, the physical erasing units originally from the replacement area 608 are then associated with the spare area 604.

Referring to FIG. 7, as described above, the physical erasing units of the data area 602 and the spare area 604 are configured for storing data written from the host system 11 in an alternating manner. In this exemplary embodiment, the memory control circuit unit 404 (or the memory management circuit 502) allocates logical addresses 710(0) to 710(D) to the host system 11 for mapping physical erasing units 414(0) to 410(F-1) in the data area 602, so as to facilitate data accessing in the physical erasing units stored with data in said alternating manner. Particularly, the host system 11 accesses the data in the data area 602 through the logical addresses 710(0) to 710(D). In this exemplary embodiment, one logical address is mapped to one physical sector, a logical programming unit is constituted by multiple logical addresses, and a logical erasing unit is constituted by multiple logical programming units.

Further, the memory control circuit unit 404 (or the memory management circuit 502) establishes a logical-physical mapping table to record a mapping relation between the logical addresses and the physical erasing units. In this exemplary embodiment, the memory control circuit unit 404 (or the memory management circuit 502) manages the rewritable non-volatile memory module 406 by the logical programming units. Therefore, one logical-physical mapping table is established by the memory control circuit unit 404 (or the memory management circuit 502) for recording a mapping relation between the logical programming units and the physical programming units. In another exemplary embodiment, the memory control circuit unit 404 (or the memory management circuit 502) manages the rewritable non-volatile memory module 406 by the logical erasing units. Therefore, one logical-physical mapping table is established by the memory control circuit unit 404 (or the memory management circuit 502) for recording a mapping relation between the logical erasing units and the physical erasing units.

In this exemplary embodiment, the memory control circuit unit 404 (or the memory management circuit 502) configures a plurality of super physical units, and each of the super physical units includes at least two physical erasing units. The memory control circuit unit 404 (or the memory management circuit 505) uses the super physical unit to store data. For example, when the host system issues a write command, the memory control circuit unit 404 (or the memory management circuit 505) selects one super physical unit to program data. The memory control circuit unit 404 (or the memory management circuit 502) can configure two different types of the super physical units including a first type super physical unit and a second type super physical unit. At least two physical erasing units in one first type super physical unit belong to different operation units (e.g., belong to different planes or dies) and may be programmed simultaneously or alternately. At least two physical erasing units in one second type super physical unit will not be programmed simultaneously. Further, among the physical erasing units included by one second type super physical unit, at least two physical erasing units belong to the same plane or die. In an example where one super physical unit includes four physical erasing units, the four physical erasing units of one first type super physical unit all belong to different planes or dies. However, the four physical erasing units of one second type super physical unit may all belong to the same plane or die. Alternatively, two physical erasing units (or three physical erasing units) belong to the same plane or die while the other physical erasing units belong to different planes or dies.

Figure 8A:
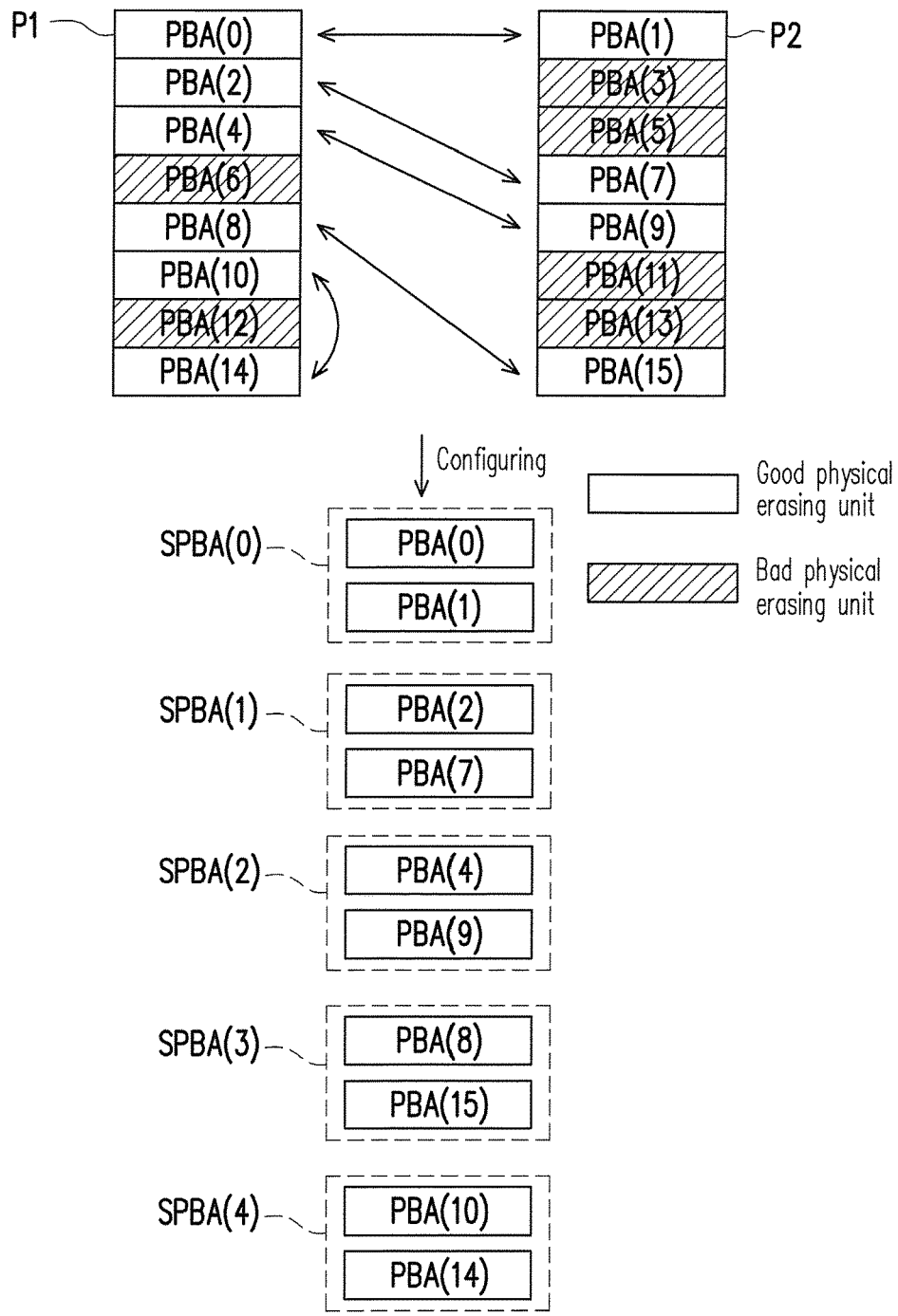
FIG. 8A is a schematic diagram illustrating an example for configuring the super physical unit according to an exemplary embodiment.

FIG. 8A is a schematic diagram illustrating an example for configuring the super physical unit according to an exemplary embodiment. In this exemplary embodiment, it is assumed that each super physical unit includes two physical erasing units.

Referring to FIG. 8A, the following description takes the plane for example and assumes that the rewritable non-volatile memory module 406 includes two planes P1 and P2, and each of the planes P1 and P2 includes eight physical erasing units. The plane P1 includes two bad physical erasing unit (i.e., physical erasing units PBA(6) and PBA(12) depicted by dashed lines), and the plane P2 includes four bad physical erasing units (i.e., physical erasing units PBA(3), PBA(5), PBA(11) and PBA(13) depicted by dashed lines). In other words, the number of the good physical erasing units in the plane P1 is 6 and the number of the good physical erasing units in the plane P2 is 4. In this exemplary embodiment, the memory control circuit unit 404 (or the memory management circuit 502) first configures the first type super physical units. In other words, the memory control circuit unit 404 (or the memory management circuit 502) selects one good physical erasing unit from each of the planes P1 and P2 for configuring one first type super physical unit. For instance, the memory control circuit unit 404 (or the memory management circuit 502) configures a good physical erasing unit PBA(0) belonging to the plane P1 and a good physical erasing unit PBA(1) belonging to the plane P2 as a first type super physical unit SPBA(0). By analogy, the memory control circuit unit 404 (or the memory management circuit 502) can configure the first type super physical units SPBA(0) to SPBA(3), and two good physical erasing units included by each of these first type super physical units belong to the planes P1 and P2, respectively. In this exemplary embodiment, because one first type super physical unit is configured by two physical erasing units respectively belonging to the different planes, the number of the first super physical units configurable by the memory control circuit unit 404 (or the memory management circuit 502) is at most equal to the number of the good physical erasing units in the plane having less good physical erasing units. As described above, the number of the good physical erasing units in the plane P1 is 6 and the number of the good physical erasing units included by the plane P2 is 4. In other words, the number of the good physical erasing units included by the plane P2 is less than the number of the good physical erasing units included by the plane P1. Therefore, the number of the first type super physical units configurable by the memory control circuit unit 404 (or the memory management circuit 502) is at most equal to the number of the good physical erasing units included by the plane P2 (i.e., four first type super physical units may be configured at most). Accordingly, after the largest number of the first type super physical units are configured, the good physical erasing units which may not be configured as the first type super physical units will be present in the plane having more good physical erasing units.

On that basis, the memory control circuit unit 404 (or the memory management circuit 502) configures the second type super physical units, and each of the second type super physical units includes two physical erasing units belonging to the same plane. As shown in FIG. 8A, because the plane P1 has more good physical erasing units than the plane P2, good physical erasing units PBA(10) and PBA(14) which may not be configured as the first type super physical unit will be present in the plane P1 after the largest number of the first type super physical units are configured. The memory control circuit unit 404 (or the memory management circuit 502) configures the good physical erasing units PBA(10) and PBA(14) as one second type super physical unit SPBA(4). As such, the good physical erasing units in the planes P1 and P2 may all be configured as the super physical units.

In this exemplary embodiment, one logical erasing unit is mapped to one super physical unit (i.e., one logical erasing unit is mapped to multiple physical erasing units). As described above, a product of said positive integers n, m and k represents the number of physical erasing units in one super physical unit, namely, the product represents the number of the physical erasing units mapped to one logical erasing unit. In the exemplary embodiments of FIGS. 8B and 8C below, the positive integer n is 1, the positive integer m is 1, and the positive integer k is 2. In other words, one logical erasing unit is mapped to two different physical erasing units.

When the host system 11 issues the write command, if the memory control circuit unit 404 (or the memory management circuit 502) is meant to program the corresponding write data into one first type super physical unit, the memory control circuit unit 404 (or the memory management circuit 502) divides the write data into multiple parts and programs these parts into the different physical erasing units of such first type super physical unit, respectively. Therefore, for the first type super physical unit, if each of the different physical erasing units mapped to one logical erasing unit belong to the different planes and one logical programming unit is mapped to multiple physical programming units belonging to the different physical erasing units, the writing speed may be increased accordingly.

Figure 8B:
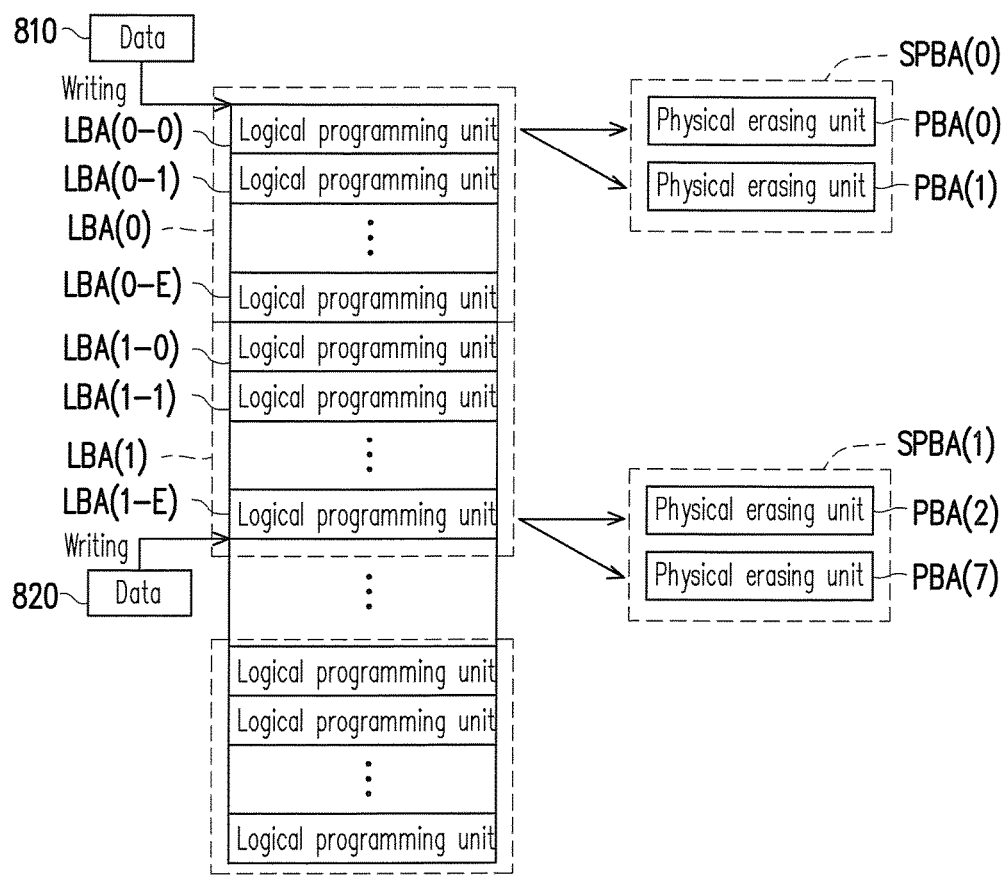
FIG. 8B is a schematic diagram illustrating an example for writing the data into the first type super physical unit according to the exemplary embodiment of FIG. 8A.

FIG. 8B is a schematic diagram illustrating an example for writing the data into the first type super physical unit according to an exemplary embodiment.

Referring to FIG. 8B, a logical erasing unit LBA(0) is mapped to the first type super physical unit SPBA(0), and the logical erasing unit LBA(0) includes logical programming units LBA(0-0) to LBA(0-E). If a capacity of one physical programming unit is 4 KB (kilobyte), a capacity of one logical programming unit is 8 KB. The host system 11 issues one write command which indicates to write data 810 into the logical programming unit LBA(0-0). Assuming that the size of the data 810 is 8 KB, the memory control circuit unit 404 (or the memory management circuit 502) divides the data 810 into two parts (i.e., a first part and a second part), where the size of each part is 4 KB. Herein, the logical address to which the second part belongs is arranged after the logical address to which the first part belongs. After the write command is received, the memory control circuit unit 404 (or the memory management circuit 502) issues at least one command sequence to write the first part of the data 810 into the physical erasing unit PBA(0) and simultaneously writes the second part of the data 810 into the physical erasing unit PBA(1).

In this exemplary embodiment, if the host system 11 further issues other write commands, the memory control circuit unit 404 (or the memory management circuit 502) writes the data indicated by said other write commands into the physical erasing units PBA(0) and PBA(1) until there is no spare physical programming unit left in the physical erasing units PBA(0) and PBA(1). Next, if the memory control circuit unit 404 (or the memory management circuit 502) receives one write command which indicates to write data 820 again, the memory control circuit unit 404 (or the memory management circuit 502) writes the data 820 into the first type super physical unit SPBA(1). For instance, the logical erasing unit LBA(1) is mapped to the first type super physical unit SPBA(1), and the logical erasing unit LBA(1) includes logical programming units LBA(1-0) to LBA(1-E). The data 820 is to be written into the logical programming unit LBA(1-E), and the size of the data 820 is 8 KB. As similar to the data 810 being divided into the two parts, the memory control circuit unit 404 (or the memory management circuit 502) also divides the second data 820 into two parts, where the size of each part is 4 KB. The memory control circuit unit 404 (or the memory management circuit 502) writes the first part of the data 820 into the physical erasing unit PBA(2) and simultaneously writes the second part of the data 820 into the physical erasing unit PBA(7).

On the other hand, when the host system 11 issues the write command, if the memory control circuit unit 404 (or the memory management circuit 502) is meant to program the corresponding write data into one second type super physical unit, the memory control circuit unit 404 (or the memory management circuit 502) can program the write data into one of the physical erasing units in such second type super physical unit in an exemplary embodiment. The memory control circuit unit 404 (or the memory management circuit 502) only programs the corresponding write data into another physical erasing unit of such second type super physical unit only when said one of the physical erasing units is fully written (i.e., there is no spare physical programming unit left). In other words, the memory control circuit unit 404 (or the memory management circuit 502) programs the write data into one physical erasing unit in the second type super physical unit first, and programs the write data into another physical erasing unit of the same second type super physical unit only when such physical erasing unit is fully written. Further, in this exemplary embodiment, for the second type super physical unit, the two different physical erasing units mapped by one logical erasing unit belong to the same plane.

Figure 8C:
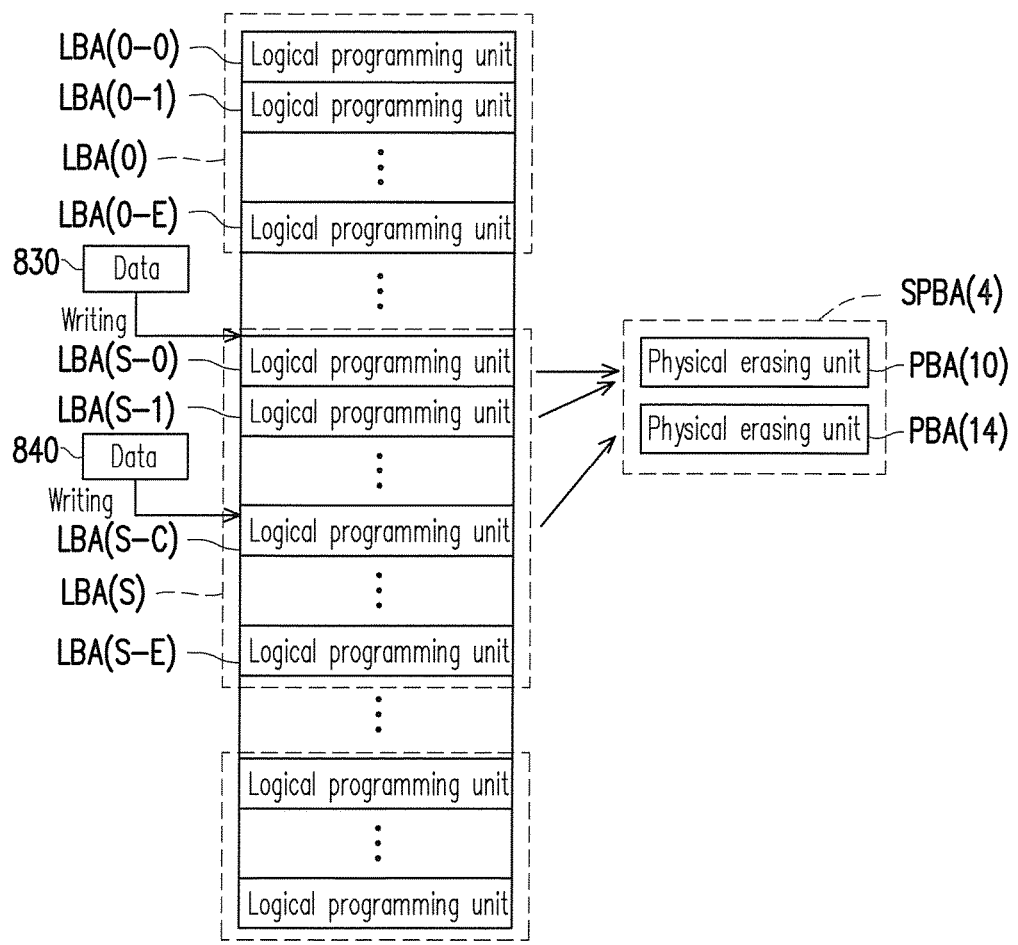
FIG. 8C is a schematic diagram illustrating an example for writing the data into the second type super physical unit according to the exemplary embodiment of FIG. 8A.

FIG. 8C is a schematic diagram illustrating an example for writing the data into the second type super physical unit according to an exemplary embodiment.

Referring to FIG. 8C, a logical erasing unit LBA(S) is mapped to the second type super physical unit SPBA(4), and the logical erasing unit LBA(S) includes logical programming units LBA(S-0) to LBA(S-E). It is assumed that one logical programming unit is mapped to multiple physical programming units in the same physical erasing unit. As described above, the capacity of one physical programming unit is 4 KB, and the capacity of one logical programming unit is 8 KB. The host system 11 issues one write command which indicates to write data 830 into the logical programming unit LBA(S-0). The memory control circuit unit 404 (or the memory management circuit 502) programs the data 830 into the physical erasing unit PBA(10) of the second type super physical unit SPBA(4). For example, it is assumed herein that the size of the data 830 is 8 KB. In an exemplary embodiment, the memory control circuit unit 404 (or the memory management circuit 502) issues at least one command sequence to program a first part of the data 830 into a first physical programming unit of the physical erasing unit PBA(10) and writes a second part of the data 830 into a second physical programming unit of the physical erasing unit PBA(10). Herein, the logical address to which the second part of the data 830 belongs is arranged after the logical address to which the first part of the data 830 belongs. Specifically, the memory control circuit unit 404 (or the memory management circuit 502) programs the received write data into the physical programming units of the physical erasing unit PBA(10) according to an arrangement sequence of the physical programming units of the physical erasing unit PBA(10). In other words, after the programing of one physical programming unit of the physical erasing unit PBA(10) is completed, the programming of the next physical programming unit of the physical erasing unit PBA(10) is executed.

As described above, the memory control circuit unit 404 (or the memory management circuit 502) first programs the data into one physical programming unit of the second type super physical unit in a manner of one physical programming unit after another physical programming unit. In this exemplary embodiment, if the host system 11 further issues other write commands, the memory control circuit unit 404 (or the memory management circuit 502) first writes the data indicated by said other write commands into the physical erasing unit PBA(10) until there is no spare physical programming unit left in the physical erasing unit PBA(10). Next, if the memory control circuit unit 404 (or the memory management circuit 502) receives one write command which indicates to write data 840 again, the memory control circuit unit 404 (or the memory management circuit 502) writes the data 840 into the physical erasing unit PBA(14) of the second type super physical unit SPBA(4). For instance, the data 840 is to be written into the logical programming unit LBA(S-C), and the size of the data 840 is 8 KB. Because there is no spare physical programming unit left in the physical erasing unit PBA(10), the memory control circuit unit 404 (or the memory management circuit 502) sequentially programs the data 840 into a first physical programming unit and a second physical programming unit in the physical erasing unit PBA(14) of the second type super physical unit SPBA(4).

It is worth mentioning that, in the exemplary embodiment of FIG. 8C, the memory control circuit unit 404 (or the memory management circuit 502) can program the write data into the second type super physical unit by using a cache program writing operation method. For example, the memory control circuit unit 404 (or the memory management circuit 502) can first temporarily store the write data into a buffer area of the buffer memory 508 and reply a confirmation message for the host system 11 to notify the host system 11 that the write command is completed and the next write command may be issued. Thereafter, the write data is programmed from the buffer area of the buffer memory 508 into the second type super physical unit. For example, when a data quantity of the data temporarily stored in the buffer area reaches a threshold, an operation of programming the data in the buffer area into the second type super physical unit may be executed. Therefore, the memory control circuit unit 404 (or the memory management circuit 502) can use the cache program writing operation method to complete the programming of one physical erasing unit in the second type super physical unit before executing the programming of another physical erasing unit in the second type super physical unit.

However, in another exemplary embodiment, the multiple physical erasing units of the second type super physical unit may be programmed alternately. Taking FIG. 8C for example, it is assumed that one logical programming unit is mapped to multiple physical programming units in the different physical erasing units. When the write command which indicates to write the data 830 into the logical programming units LBA(S-0) is received, the memory control circuit unit 404 (or the memory management circuit 502) can issue at least one command sequence to program the first part of the data 830 into a first physical programming unit of the physical erasing unit PBA(10) of the super physical unit SPBA(4). Then, after the programming of the first physical programming unit of the physical erasing unit PBA(10) is completed, the second part of the data 830 is programmed into a first physical programming unit of the physical erasing unit PBA(14) of the super physical unit SPBA(4). By analogy, the memory control circuit unit 404

(or the memory management circuit 502) alternately programs the subsequently received write data into the physical erasing unit PBA(10) and the physical erasing unit PBA(14) of the super physical unit SPBA(4). For example, when the write command which indicates to write the data 840 into the logical programming units LBA(S-C) is received, the memory control circuit unit 404 (or the memory management circuit 502) also issues at least one command sequence to program the first part of the data 840 into one physical programming unit of the physical erasing unit PBA(10) of the super physical unit SPBA(4). Further, after the programming of the physical programming unit of the physical erasing unit PBA(10) is completed, the second part of the data 840 is programmed into another physical programming unit of the physical erasing unit PBA(14) of the super physical unit SPBA(4). In other words, the memory control circuit unit 404 (or the memory management circuit 502) alternately programs the data into the second type super physical unit in a manner of one physical programming unit after another physical programming unit.

Figure 9A:
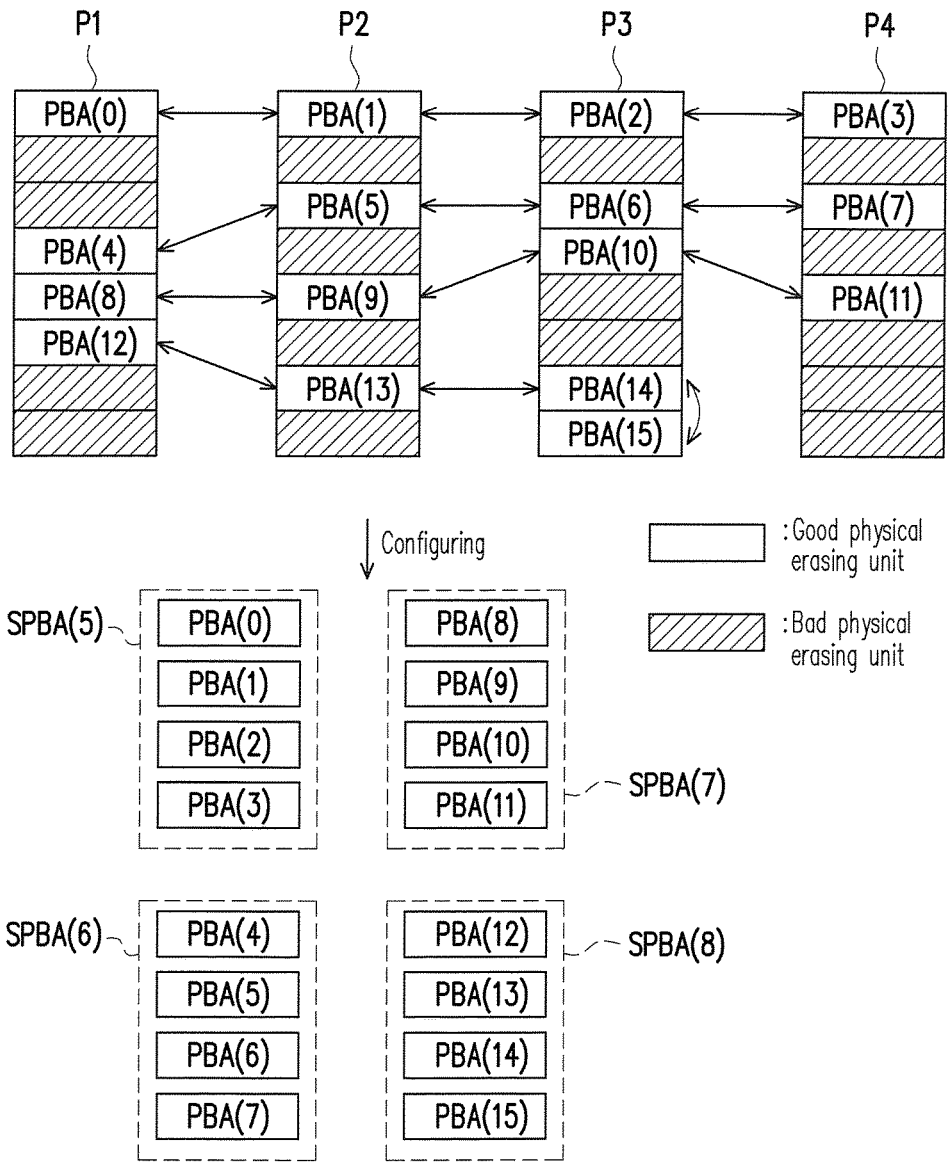
FIG. 9A is a schematic diagram illustrating an example for configuring the super physical unit according to another exemplary embodiment.

FIG. 9A is a schematic diagram illustrating an example for configuring the super physical unit according to another exemplary embodiment. Unlike FIG. 8A, in this exemplary embodiment, it is assumed that each super physical unit includes four physical erasing units.

Referring to FIG. 9A, it is assumed that the rewritable non-volatile memory module 406 includes four planes P1, P2, P3 and P4, and each of the planes P1, P2, P3 and P4 includes eight physical erasing units. As described above, the memory control circuit unit 404 (or the memory management circuit 502) uses the good physical erasing units in each plane to configure the super physical units. In this exemplary embodiment, the memory control circuit unit 404 (or the memory management circuit 502) selects one good physical erasing unit from each of the planes P1, P2, P3 and P4 for configuring one first type super physical unit. For instance, the memory control circuit unit 404 (or the memory management circuit 502) configures a good physical erasing unit PBA(0) belonging to the plane P1, a good physical erasing unit PBA(1) belonging to the plane P2, a good physical erasing unit PBA(2) belonging to the plane P3 and a good physical erasing unit PBA(3) belonging to the plane P4 as a first type super physical unit SPBA(5), and the rest may deduced by analogy. In this exemplary embodiment, since the plane P4 only includes three good physical erasing units, the memory control circuit unit 404 (or the memory management circuit 502) can only configure three first type super physical units SPBA(5), SPBA(6) and SPBA(7) at most, and four good physical erasing units included by each of the first type super physical units belong to the planes P1, P2, P3 and P4, respectively.

After the largest number of the first type super physical units are configured, the good physical erasing units which may not be configured as the first type super physical units are still present in the planes P1, P2 and P3. Each of the planes P1 and P2 includes one remaining good physical erasing unit (i.e., physical erasing units PBA(12) and PBA(13)) while the plane P3 includes two remaining good physical erasing units (i.e., physical erasing units PBA(14) and PBA(15)). One the basis, the memory control circuit unit 404 (or the memory management circuit 502) configures the remaining four good physical erasing units as one second type super physical unit. As shown in FIG. 9A, the memory control circuit unit 404 (or the memory management circuit 502) configures the good physical erasing unit PBA(12) belonging to the plane P1, the good physical erasing unit PBA(13) belonging to the plane P2 and the good physical erasing units PBA(14) and PBA(15) belonging to the plane P3 as a second type super physical unit SPBA(8).

In this exemplary embodiment, the four good physical erasing units included by the second type super physical unit SPBA(8) belong to the planes P1, P2 and P3, respectively. In other words, the second type super physical unit SPBA(8) includes at least two good physical erasing units which belong to the same plane.

As described above, a product of said positive integers n, m and k represents the number of physical erasing units in one super physical unit, namely, the product represents the number of the physical erasing units mapped to one logical erasing unit. In the exemplary embodiments of FIGS. 9B and 9C below, the positive integer n is 1, the positive integer m is 2, and the positive integer k is 2. In other words, one logical erasing unit is mapped to four different physical erasing units. Further, to simplify the description, in the exemplary embodiments of FIGS. 9B and 9C, it is assumed that the capacity of one physical programming unit is 4 KB and the capacity of one logical programming unit is 16 KB.

Figure 9B:
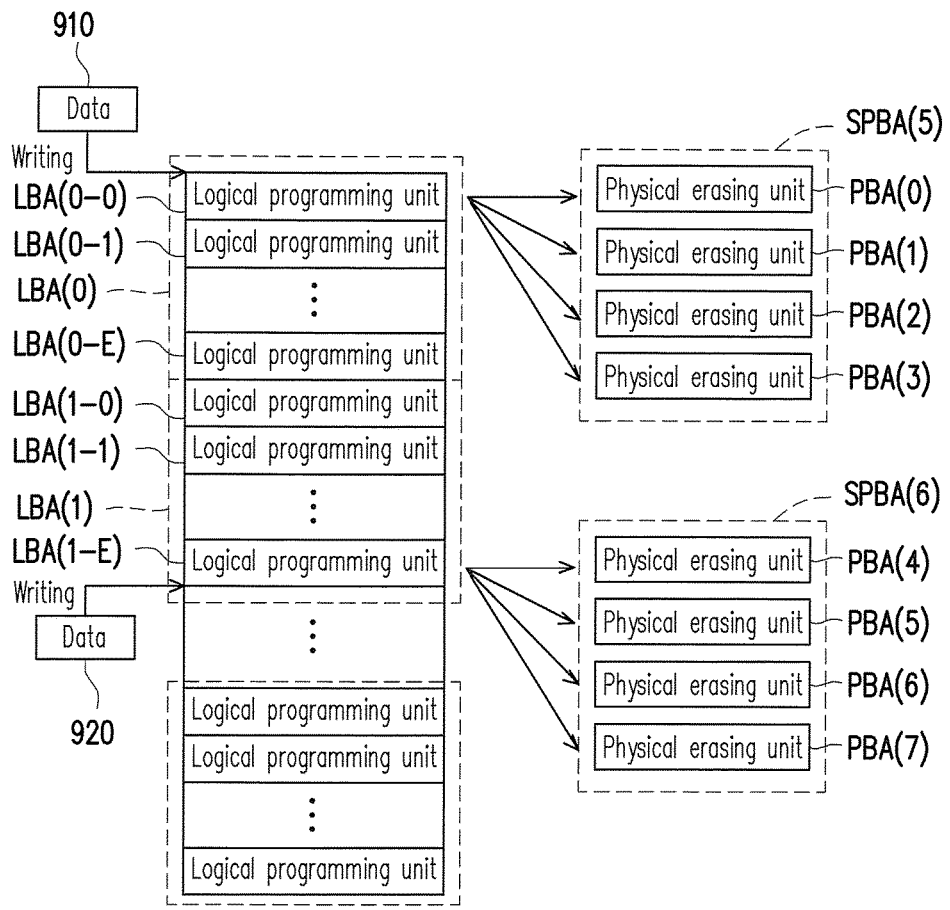
FIG. 9B is a schematic diagram illustrating an example for writing the data into the first type super physical unit according to the exemplary embodiment of FIG. 9A.

FIG. 9B is a schematic diagram illustrating an example for writing the data into the first type super physical unit according to the exemplary embodiment of FIG. 9A.

Because the good physical erasing units in the first type super physical unit belong to the different planes, the memory control circuit unit 404 (or the memory management circuit 502) programs the write data into the first type super physical unit by the same method as described in the exemplary embodiment of FIG. 8B.

Referring to FIG. 9B, the logical erasing unit LBA(0) is mapped to the first type super physical unit SPBA(5). The host system 11 issues a write command which indicates to write data 910 into the logical programming unit LBA(0-0). It is assumed herein that the size of the data 910 is 16 KB. The memory control circuit unit 404 (or the memory management circuit 502) divides the data 910 into four parts, where the size of each part is 4 KB. After the write command is received, the memory control circuit unit 404 (or the memory management circuit 502) simultaneously writes the four parts of the data 910 into the physical erasing units PBA(0), PBA(1), PBA(2) and PBA(3) of the first type super physical unit SPBA(5), respectively. When the memory control circuit unit 404 (or the memory management circuit 502) receives one write command which indicates to write data 920 again, if there is no spare physical programming unit in the physical erasing units PBA(0), PBA(1), PBA(2) and PBA(3) of the first type super physical unit SPBA(5), the memory control circuit unit 404 (or the memory management circuit 502) writes the data 920 into the first type super physical unit SPBA(6). The method of writing the data into the first type super physical unit has been described in the exemplary embodiment of FIG. 8B, which is not repeated hereinafter.

Figure 9C:
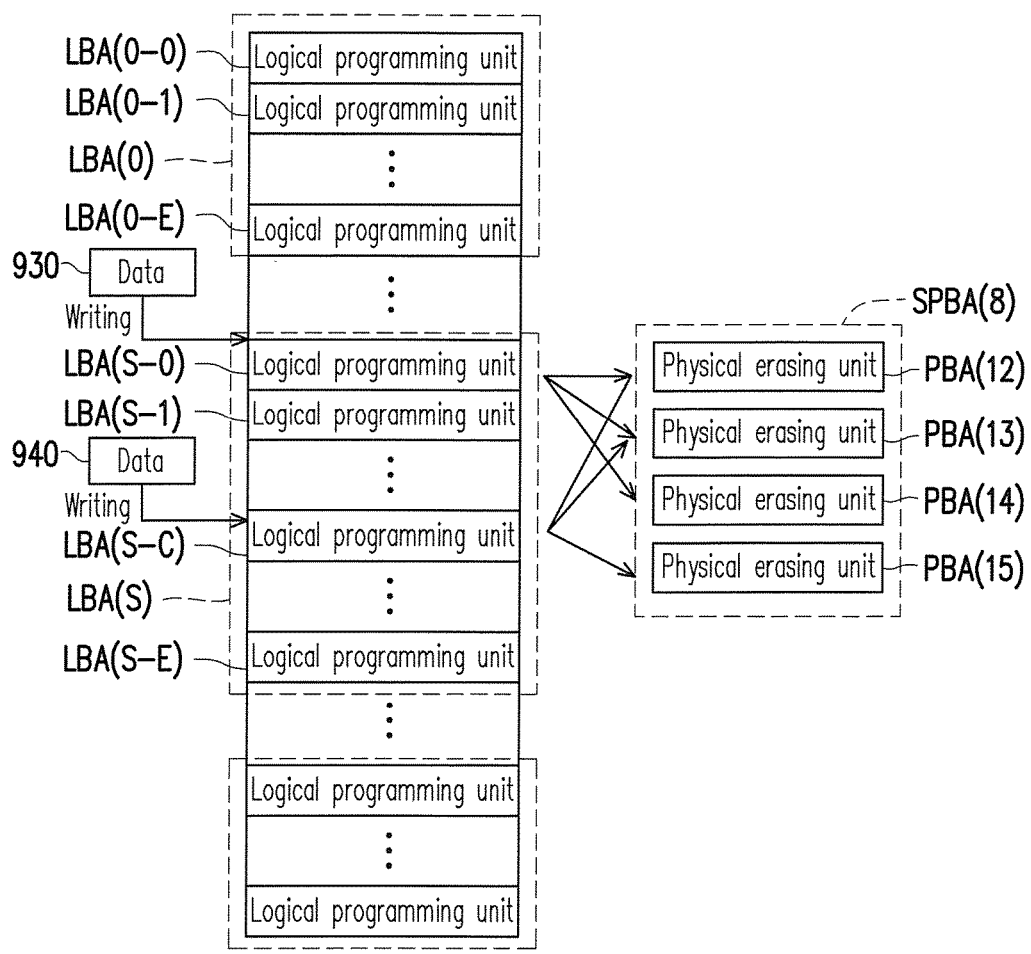
FIG. 9C is a schematic diagram illustrating an example for writing the data into the second type super physical unit according to the exemplary embodiment of FIG. 9A.

FIG. 9C is a schematic diagram illustrating an example for writing the data into the second type super physical unit according to the exemplary embodiment of FIG. 9A.

In this exemplary embodiment, one second type super physical unit includes the physical erasing units belonging to the same plane and the physical erasing units belonging to the different panes. In other words, for the second type super physical unit in this exemplary embodiment, two physical erasing units among the four physical erasing units mapped to one logical erasing unit belong to the same plane.

Referring to FIG. 9C, the logical erasing unit LBA(S) is mapped to the second type super physical unit SPBA(8). In the second type super physical unit SPBA(8), the physical erasing unit PBA(12) belongs to the plane P1, the physical erasing unit PBA(13) belongs to the plane P2 and the physical erasing units PBA(14) and PBA(15) belong to the plane P3. The host system 11 issues a write command which indicates to write data 930 into the logical programming unit LBA(S-0). Assuming that the size of the data 930 is 16 KB, the memory control circuit unit 404 (or the memory management circuit 502) divides the data 930 into four parts (i.e., a first part to a fourth part), where the size of each part is 4 KB. The memory control circuit unit 404 (or the memory management circuit 502) issues at least one command sequence to program the first part and the second part of the data 930 into the physical erasing units PBA(12) and PBA(13) of the second type super physical unit SPBA(8), respectively, and write both the third part and the fourth part of the data 930 into the physical erasing unit PBA(14) of the second type super physical unit SPBA(8). For example, the memory control circuit unit 404 (or the memory management circuit 502) programs the first part of the data 930 into a first physical programming unit of the physical erasing unit PBA(12), writes the second part of the data 930 into a first physical programming unit of the physical erasing unit PBA(13), and writes the third part and the fourth part of the data 930 into a first physical programming unit and a second physical programming unit of the physical erasing unit PBA(14). If the host system 11 further issues other write commands, the memory control circuit unit 404 (or the memory management circuit 502) writes the data indicated by those write commands into the physical erasing units PBA(12), PBA(13) and PBA(14), respectively, until there is no spare physical programming unit left in the physical erasing unit PBA(14). Next, if the memory control circuit unit 404 (or the memory management circuit 502) receives one write command which indicates to write data 940 again, the memory control circuit unit 404 (or the memory management circuit 502) writes the data 940 into the physical erasing units PBA(12), PBA(13) and PBA(15) of the second type super physical unit SPBA(8), respectively.

In other words, the physical erasing units PBA(12), PBA(13) and PBA(14) (or PBA(15)) of the second type super physical unit SPBA(8) may be simultaneously programmed with data since they belong to the different planes. Because the physical erasing units PBA(14) and PBA(15) of the second type super physical unit SPBA(8) belong to the same plane, the data is first programmed into the physical erasing unit PBA(14) during the writing operation. The data is only programmed into the physical erasing unit PBA(15) when there is no spare physical programming unit left in the physical erasing unit PBA(14). Further, the physical erasing units PBA(14) and PBA(15) of the second type super physical unit SPBA(8) are programmed with data in a manner of one physical programming unit after another physical programming unit. However, the invention is not limited to the above. The physical erasing units PBA(14) and PBA(15) of the second type super physical unit SPBA (8) may also be programmed alternately.

Figure 10:
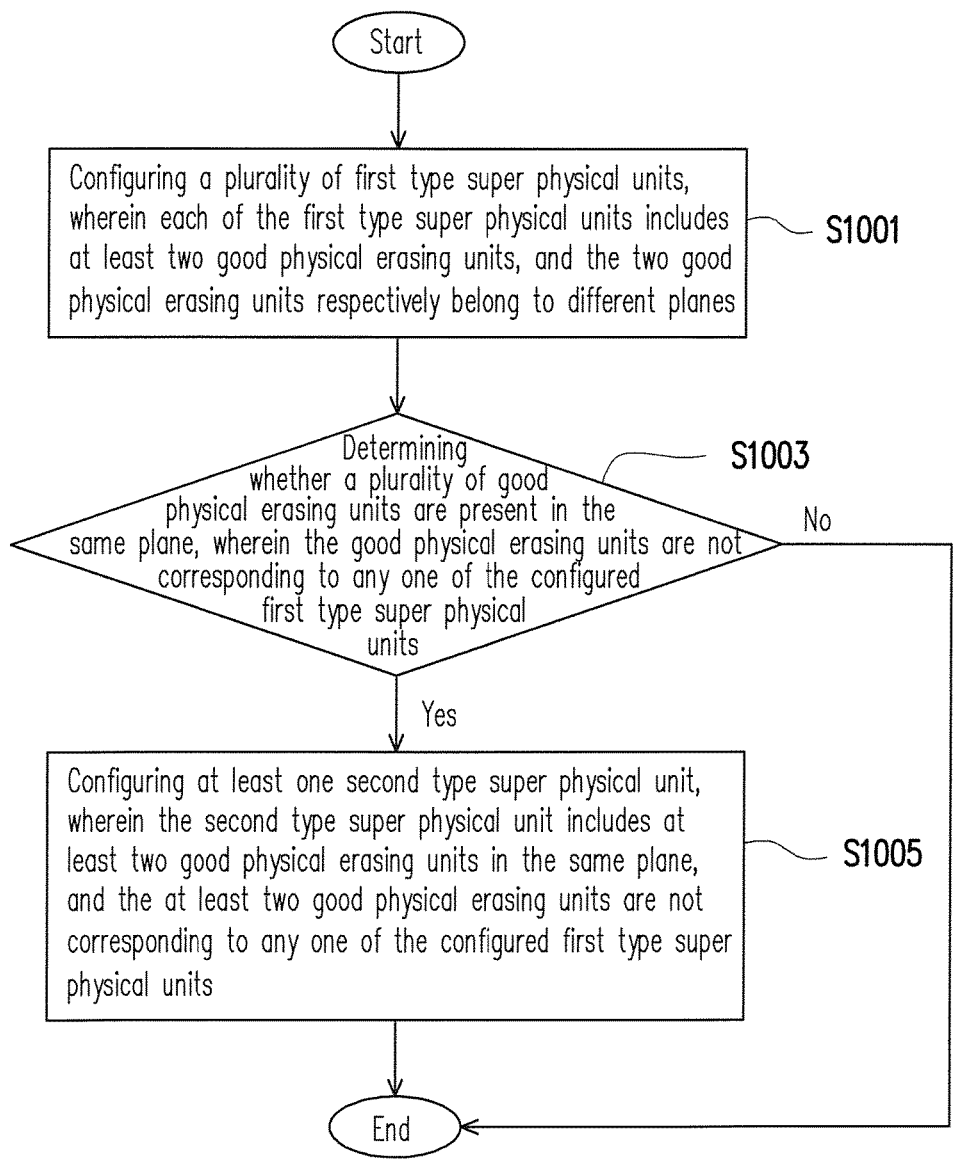
FIG. 10 is a flowchart illustrating the memory management method for configuring the super physical unit according to an exemplary embodiment.

FIG. 10 is a flowchart illustrating the memory management method for configuring the super physical unit according to an exemplary embodiment.

Referring to FIG. 10, in step S1001, the memory control circuit unit 404 (or the memory management circuit 502) configures a plurality of first type super physical units, wherein each of the first type super physical units includes at least two good physical erasing units, and these two good physical erasing units respectively belong to different planes. In this exemplary embodiment, the memory control circuit unit 404 (or the memory management circuit 502) can determine whether the good physical erasing units which may be configured as the first type super physical unit are present each plane. Further, step S1001 may be executed repeatedly if the good physical erasing units which may be configured as the first type super physical unit are still present in each of the planes.

In step S1003, the memory control circuit unit 404 (or the memory management circuit 502) determines whether a plurality of good physical erasing units are present in the same plane, wherein the good physical erasing units are not corresponding to any one of the configured first type super physical units. In this exemplary embodiment, step S1003 is executed when the good physical erasing units which can be configured as the first type super physical unit are not present in each of the planes.

If the good physical erasing units not corresponding to any one of the configured first type super physical units are not present in the same plane, in step S1005, the memory control circuit unit 404 (or the memory management circuit 502) configures at least one second type super physical unit, wherein the second type super physical unit includes at least two good physical erasing units in the same plane, and the at least two good physical erasing units are not corresponding to any one of the configured first type super physical units. In this embodiment, the at least two good physical erasing units are the good physical erasing units which cannot be configured as the first type super physical unit. In addition, if the good physical erasing units not corresponding to any one of the first type super physical units are not present in the same plane (e.g., the at least two good physical erasing units not corresponding to any one of the configured first type super physical units are not present in the same plane), the flow of configuring the super physical unit ends.

Figure 11:
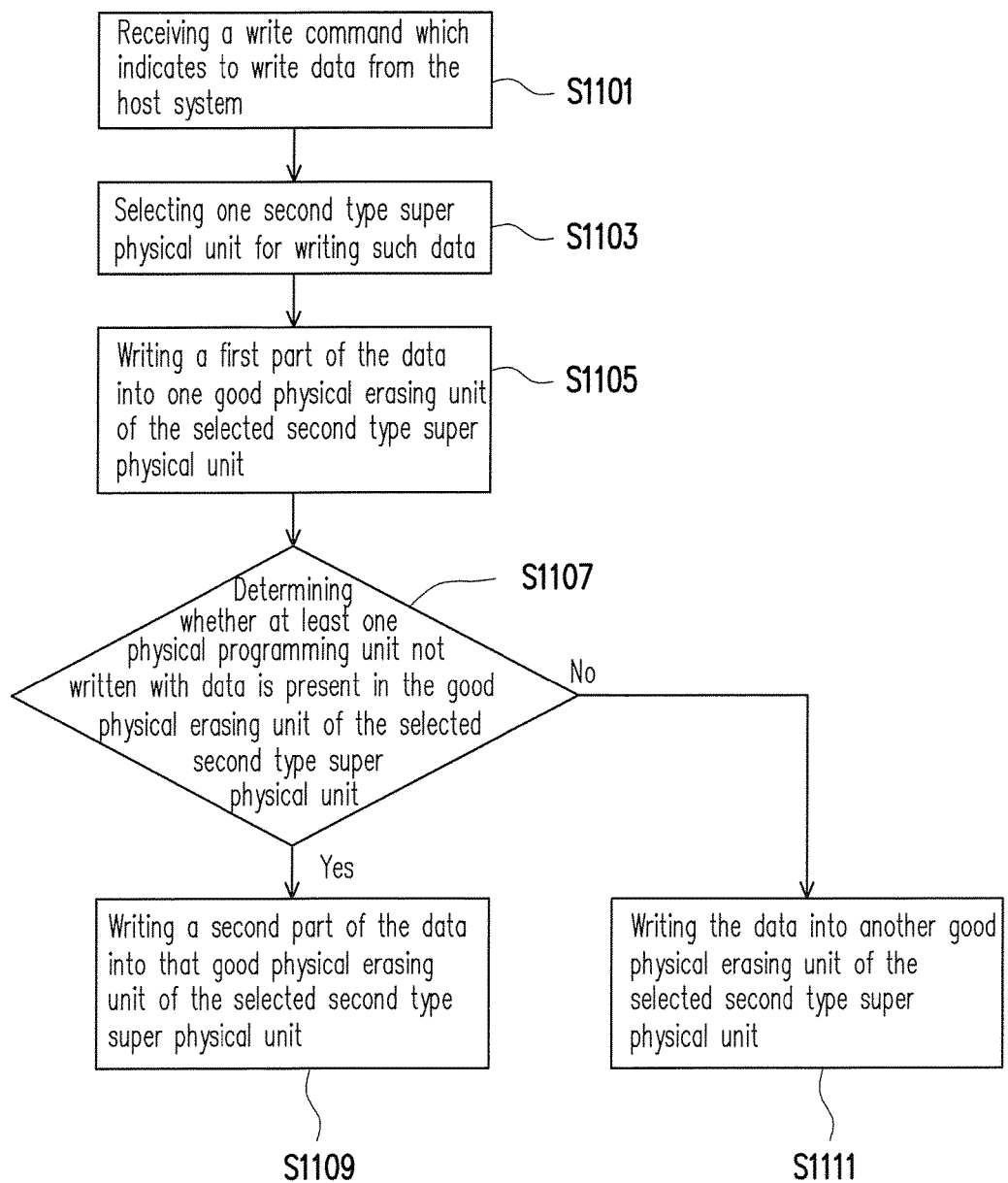
FIG. 11 is a flowchart illustrating the memory management method for writing data into the second type super physical unit according to an exemplary embodiment.

FIG. 11 is a flowchart illustrating the memory management method for writing data into the second type super physical unit according to an exemplary embodiment.

In step S1101, a write command which indicates to write data is received from the host system.

In step S1103, the memory control circuit unit 404 (or the memory management circuit 502) selects one second type super physical unit for writing such data.

In step S1105, the memory control circuit unit 404 (or the memory management circuit 502) writes a first part of the data into one good physical erasing unit of the selected second type super physical unit.

In step S1107, the memory control circuit unit 404 (or the memory management circuit 502) determines whether at least one physical programming unit not written with data (i.e., the spare physical programming unit) is present in the good physical erasing unit of the selected second type super physical unit.

If the at least one physical programming unit not written with data is present in the good physical erasing unit of the selected second type super physical unit, in step S1109, the memory control circuit unit 404 (or the memory management circuit 502) writes a second part of the data into that good physical erasing unit of the selected second type super physical unit.

If the physical programming unit not written with data is not present in the good physical erasing unit of the selected second type super physical unit, in step S1111, the memory control circuit unit 404 (or the memory management circuit 502) writes the data into another good physical erasing unit of the selected second type super physical unit.

In another exemplary embodiment, before step S1105, the memory control circuit unit 404 (or the memory management circuit 502) can temporarily store the data into a buffer area of a buffer memory. Moreover, aforesaid steps have been described in detail as the above, which is not repeated hereinafter.

In summary, other than the capability of using the good physical erasing units belonging to the different planes or dies to configure the super physical unit, the invention can also use the good physical erasing unit belonging to the same plane or die to configure the super physical unit. In other words, the good physical erasing units which may not be configured as the first type super physical unit in the same plane or die may be used to configure the second type super physical unit. As a result, not only may the number of the configured super physical units be increased, the good physical erasing units in the rewritable non-volatile memory module may also be utilized more efficiently.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A memory management method for a flash memory device, wherein the flash memory device has a flash memory module having a plurality of good physical erasing units and each of good physical erasing units has a plurality of physical programming units, the memory management method comprising:
    allocating a part of the good physical erasing units to configure a plurality of first type super physical units, wherein each first type super physical unit among the first type super physical units at least comprises a first good physical erasing unit from a first plane and a second good physical erasing unit from a second plane, and the first good physical erasing unit and the second good physical erasing unit are simultaneously programmed; and
    when a number of the good physical erasing units included by the second plane is less than a number of the good physical erasing units included by the first plane, allocating another part of the good physical erasing units to configure at least one second type super physical unit, wherein the at least one second type super physical unit at least comprises a third good physical erasing unit and a fourth good physical erasing unit, and the third good physical erasing unit and the fourth good physical erasing unit belong to the first plane.

2. The memory management method of claim 1, further comprising:
    receiving a first write command which indicates to write first data from a host system, wherein the first data comprises a first part and a second part;
    writing the first part of the first data into the third good physical erasing unit;
    writing the second part of the first data into the third good physical erasing unit if at least one physical programming unit of the third good physical erasing unit is not written with data after the first part of the first data is written into the third good physical erasing unit; and
    writing the second part of the first data into the fourth good physical erasing unit if all of the physical programming units of the third good physical erasing unit is written with data after the first part of the first data is written into the third good physical erasing unit.

3. The memory management method of claim 2, further comprising:
    configuring a plurality of logical addresses, wherein the first part of the first data belongs to at least one first logical address among the logical addresses, the second part of the first data belongs to at least one second logical address among the logical address, and the at least one second logical address is arranged after the at least one first logical address.

4. The memory management method of claim 3, wherein the logical addresses constitute a plurality of logical programming units, the logical programming units constitute a plurality of logical erasing units, and the at least one second type super physical unit is mapped to at least one of the logical erasing units.

5. The memory management method of claim 2, wherein the step of receiving the first write command which indicates to write the first data from the host system comprises:
    storing the first data into a buffer area of a buffer memory and replying the first write command.

6. The memory management method of claim 1, further comprising:
    receiving a first write command which indicates to write first data from a host system, wherein the first data comprises a first part and a second part;
    writing the first part of the first data into the third good physical erasing unit; and
    writing the second part of the first data into the fourth good physical erasing unit.

7. The memory management method of claim 1, further comprising:
    receiving a write command which indicates to write second data from a host system, wherein the second data comprises a first part and a second part;
    writing the first part of the second data into the first good physical erasing unit of one of the first type super physical units; and
    writing the second part of the second data into the second good physical erasing unit of the one of the first type super physical units.

8. A memory control circuit unit for controlling a flash memory module, wherein the flash memory module has a plurality of good physical erasing units and each of the good physical erasing units has a plurality of physical programming units, the memory control circuit unit comprising:
    a host interface configured to couple to a host system;
    a memory interface configured to couple to the flash memory module; and
    a memory management circuit coupled to the host interface and the memory interface,
    wherein the memory management circuit is configured to allocate a part of the good physical erasing units to configure a plurality of first type super physical units, wherein each first type super physical unit among the first type super physical units at least comprises a first good physical erasing unit from a first plane and a second good physical erasing unit from a second plane, and the first good physical erasing unit and the second good physical erasing unit are simultaneously programmed,
    when a number of the good physical erasing units included by the second plane is less than a number of the good physical erasing units included by the first plane, the memory management circuit is further configured to allocate another part of the good physical erasing units to configure at least one second type super physical unit, wherein the at least one second type super physical unit at least comprises a third good physical erasing unit and a fourth good physical erasing unit, and the third good physical erasing unit and the fourth good physical erasing unit belong to the first plane.

9. The memory control circuit unit of claim 8,
wherein the memory management circuit is further configured to receive a first write command which indicates to write first data from the host system, wherein the first data comprises a first part and a second part,
wherein the memory management circuit is further configured to issue a first command sequence to write the first part of the first data into the third good physical erasing unit,
wherein the memory management circuit is further configured to issue a second command sequence to write the second part of the first data into the third good physical erasing unit if at least one physical programming unit of the third good physical erasing unit is not written with data after the first part of the first data is written into the third good physical erasing unit,
wherein the memory management circuit is further configured to issue a third command sequence to write the second part of the first data into the fourth good physical erasing unit if all of the physical programming units of the third good physical erasing unit is written with data after the first part of the first data is written into the third good physical erasing unit.

10. The memory control circuit unit of claim 9, wherein the memory management circuit is further configured to configure a plurality of logical addresses, wherein the first part of the first data belongs to at least one first logical address among the logical addresses, the second part of the first data belongs to at least one second logical address among the logical address, and the at least one second logical address is arranged after the at least one first logical address.

11. The memory control circuit unit of claim 10, wherein the logical addresses constitute a plurality of logical programming units, the logical programming units constitute a plurality of logical erasing units, and the at least one second type super physical unit is mapped to at least one of the logical erasing units.

12. The memory control circuit unit of claim 9, wherein the memory management circuit is further configured to store the first data into a buffer area of a buffer memory and reply the first write command.

13. The memory control circuit unit of claim 8, wherein the memory management circuit is further configured to receive a first write command which indicates to write first data from the host system, wherein the first data comprises a first part and a second part,
wherein the memory management circuit is further configured to issue a first command sequence to write the first part of the first data into the third good physical erasing unit,
wherein the memory management circuit is further configured to issue a second command sequence to write the second part of the first data into the fourth good physical erasing unit.

14. The memory control circuit unit of claim 8, wherein the memory management circuit is further configured to receive a write command which indicates to write second data from the host system, wherein the second data comprises a first part and a second part,
wherein the memory management circuit is further configured to issue a first command sequence to write the first part of the second data into the first good physical erasing unit of one of the first type super physical units,
wherein the memory management circuit is further configured to issue a second command sequence to write the second part of the second data into the second good physical erasing unit of the one of the first type super physical units.

15. A flash memory device, comprising:
a connection interface unit configured to couple to a host system;
a flash memory module comprising a plurality of good physical erasing units, wherein each of the good physical erasing units has a plurality of physical programming units; and
a memory control circuit unit, coupled to the connection interface unit and the flash memory module,
wherein the memory control circuit unit is configured to allocate a part of the good physical erasing units to configure a plurality of first type super physical units, wherein each first type super physical unit among the first type super physical units at least comprises a first good physical erasing unit from a first plane and a second good physical erasing unit from a second plane, and the first good physical erasing unit and the second good physical erasing unit are simultaneously programmed,
when a number of the good physical erasing units included by the second plane is less than a number of the good physical erasing units included by the first plane, the memory control circuit unit is further configured to allocate another part of the good physical erasing units to configure at least one second type super physical unit, wherein the at least one second type super physical unit at least comprises a third good physical erasing unit and a fourth good physical erasing unit, and the third good physical erasing unit and the fourth good physical erasing unit belong to the first plane.

16. The flash memory device of claim 15, wherein the memory control circuit unit is further configured to receive a first write command which indicates to write first data from the host system, wherein the first data comprises a first part and a second part,
wherein the memory control circuit unit is further configured to issue a first command sequence to write the first part of the first data into the third good physical erasing unit,
wherein the memory control circuit unit is further configured to issue a second command sequence to write the second part of the first data into the third good physical erasing unit if at least one physical programming unit of the third good physical erasing unit is not written with data after the first part of the first data is written into the third good physical erasing unit,
wherein the memory control circuit unit is further configured to issue a third command sequence to write the second part of the first data into the fourth good physical erasing unit if all of the physical programming units of the third good physical erasing unit is written with data after the first part of the first data is written into the third good physical erasing unit.

17. The flash memory device of claim 16, wherein the memory control circuit unit is further configured to configure a plurality of logical addresses, wherein the first part of the first data belongs to at least one first logical address among the logical addresses, the second part of the first data belongs to at least one second logical address among the logical address, and the at least one second logical address is arranged after the at least one first logical address.

18. The flash memory device of claim 17, wherein the logical addresses constitute a plurality of logical programming units, the logical programming units constitute a plurality of logical erasing units, and the at least one second type super physical unit is mapped to at least one of the logical erasing units.

19. The flash memory device of claim 16, wherein the memory control circuit unit is further configured to store the first data into a buffer area of a buffer memory and reply the first write command.

20. The flash memory device of claim 15, wherein the memory control circuit unit is further configured to receive a first write command which indicates to write first data from the host system, wherein the first data comprises a first part and a second part, wherein the memory control circuit unit is further configured to issue a first command sequence to write the first part of the first data into the third good physical erasing unit, wherein the memory control circuit unit is further configured to issue a second command sequence to write the second part of the first data into the fourth good physical erasing unit.

21. The flash memory device of claim 15, wherein the memory control circuit unit is further configured to receive a write command which indicates to write second data from the host system, wherein the second data comprises a first part and a second part, wherein the memory control circuit unit is further configured to issue a first command sequence to write the first part of the second data into the first good physical erasing unit of one of the first type super physical units, wherein the memory control circuit unit is further configured to issue a second command sequence to write the second part of the second data into the second good physical erasing unit of the one of the first type super physical units.

* * * * *